United States Patent
Joseph et al.

(10) Patent No.: US 11,221,276 B2
(45) Date of Patent: Jan. 11, 2022

(54) METHOD FOR DETECTING PHYSICAL STOPPAGE OF AN ENGINE

(71) Applicants: Continental Automotive France, Toulouse (FR); Continental Automotive GmbH, Hannover (DE)

(72) Inventors: Fabien Joseph, Castanet Tolosan (FR); Benjamin Marconato, Villeneuve Tolosane (FR); Stéphane Eloy, Tournefeuille (FR)

(73) Assignees: Continental Automotive France; Continental Automotive GmbH

( * ) Notice: Subject to any disclaimer, the term of this patent is extended or adjusted under 35 U.S.C. 154(b) by 1 day.

(21) Appl. No.: 16/954,732

(22) PCT Filed: Dec. 24, 2018

(86) PCT No.: PCT/FR2018/053537
§ 371 (c)(1),
(2) Date: Jun. 17, 2020

(87) PCT Pub. No.: WO2019/141914
PCT Pub. Date: Jul. 25, 2019

(65) Prior Publication Data
US 2021/0088412 A1    Mar. 25, 2021

(30) Foreign Application Priority Data

Jan. 16, 2018 (FR) ...................................... 1850318

(51) Int. Cl.
*G01M 15/06* (2006.01)
*F02D 35/02* (2006.01)

(52) U.S. Cl.
CPC ............. *G01M 15/06* (2013.01); *F02D 35/02* (2013.01)

(58) Field of Classification Search
CPC ............................... G01M 15/06; F02D 35/02
See application file for complete search history.

(56) References Cited

U.S. PATENT DOCUMENTS

| 2007/0044548 A1 | 3/2007 | Ishizuka et al. | |
| 2009/0020100 A1* | 1/2009 | Sakaigaki | F02D 41/22 123/350 |

(Continued)

FOREIGN PATENT DOCUMENTS

| DE | 102009000082 A1 | 7/2010 |
| FR | 2860069 A1 | 3/2005 |

(Continued)

OTHER PUBLICATIONS

International Search Report and Written Opinion for International Application No. PCT/FR2018/053537, dated May 3, 2019 with partial translation, 9 pages.

(Continued)

*Primary Examiner* — Eric S. McCall
(74) *Attorney, Agent, or Firm* — RatnerPrestia

(57) ABSTRACT

A method for detecting the physical stoppage of an internal combustion engine including a crankshaft that drives a toothed wheel having a plurality of teeth, each tooth corresponding to different angular positions of the crankshaft, a sensor positioned next to the toothed wheel generates a signal characteristic of the passage of a tooth. The method detects a tooth from the signal generated by the sensor, identifies the tooth detected, triggers a timeout, and detects stoppage of the engine if the passage of a tooth adjacent to the tooth detected has not been detected before the end of the timeout. The value of the timeout is dependent on the tooth identified, and including: determining crankshaft angular position depending on the tooth identified, the value of the timeout dependent on the angular position of the crankshaft, determining the preferential stopping positions of the crank- (Continued)

shaft and assigning a first timeout value for the preferential stopping positions and assigning at least a second value for the other positions of the crankshaft. The first timeout value being less than the second timeout value.

9 Claims, 5 Drawing Sheets

(56) References Cited

U.S. PATENT DOCUMENTS

| | | | |
|---|---|---|---|
| 2011/0118962 A1 | 5/2011 | Couetoux et al. | |
| 2011/0184626 A1 | 7/2011 | Mauritz et al. | |
| 2013/0247871 A1* | 9/2013 | Teruya | F02N 19/005 123/436 |
| 2016/0096523 A1* | 4/2016 | Ang | B60W 30/192 701/22 |
| 2016/0266008 A1* | 9/2016 | Park | F02N 19/005 |
| 2018/0080396 A1* | 3/2018 | Marconato | F02D 41/009 |
| 2018/0209362 A1 | 7/2018 | Mazenc | |
| 2019/0301389 A1* | 10/2019 | Joseph | F02N 11/0844 |
| 2020/0340412 A1* | 10/2020 | Agnus | F02D 41/009 |
| 2020/0355152 A1* | 11/2020 | Gopalakrishnan | F02N 19/005 |
| 2020/0362786 A1* | 11/2020 | Joseph | F02D 41/22 |
| 2020/0398811 A1* | 12/2020 | Glugla | B60W 10/06 |
| 2021/0262410 A1* | 8/2021 | Doering | F02D 41/042 |

FOREIGN PATENT DOCUMENTS

| | | |
|---|---|---|
| FR | 2925615 A1 | 6/2009 |
| FR | 3039215 A1 | 1/2017 |
| JP | 2009138662 A | 6/2009 |
| WO | 2015004514 A1 | 1/2015 |

OTHER PUBLICATIONS

International Search Report and Written Opinion for International Application No. PCT/FR2018/053537, dated May 3, 2019, 13 pages (French).

* cited by examiner

METHOD FOR DETECTING PHYSICAL STOPPAGE OF AN ENGINE

CROSS REFERENCE TO RELATED APPLICATIONS

This application is the U.S. National Phase Application of PCT International Application No. PCT/FR2018/053537, filed Dec. 24, 2018, which claims priority to French Patent Application No. 1850318, filed Jan. 16, 2018, the contents of such applications being incorporated by reference herein.

FIELD OF THE INVENTION

The invention relates to a method for detecting the physical stoppage of an internal combustion engine.

BACKGROUND OF THE INVENTION

The starting of an internal combustion engine is conventionally facilitated by a starter, which comprises a shaft provided with a pinion that allows the engine to begin to turn over by engaging with a pinion borne thereby.

During a, possibly brief, stoppage of the engine, it is necessary to determine that the engine is completely stopped before it can be restarted. This is because if the engine is not completely stopped when the starter is actuated, the engaging of the pinions may damage the engine and the starter.

In order to determine a stopped status of the engine, it is known practice to make use of the data acquired by an engine crankshaft rotation sensor, as for example in the document JP2009138662, incorporated herein by reference. This sensor is positioned next to a toothed wheel secured to the crankshaft, and detects the teeth of the toothed wheel as they file past when the latter is rotationally driven, typically by detecting the rising or falling front of each tooth.

Engine stoppage is detected after a timeout of 300 ms, starting from the last tooth detected. If a new tooth is detected before the timeout elapses, the timeout is interrupted and the engine is considered to be in motion.

This solution has a major drawback. It entails systematically waiting for the end of the timeout, namely 300 ms, in order to detect an engine stoppage, and therefore to authorize the restarting of the engine. However, it is desirable to be able to restart the engine as soon as possible, for example in vehicles equipped with "stop and start" devices or similar for automatically restarting the engine of a vehicle, for example in circumstances in which the driver is said to have changed his mind (for example in the case of arriving at a red light which turns to green just at the moment of stopping).

SUMMARY OF THE INVENTION

An aspect of the invention aims to alleviate the drawbacks of the prior art described above.

In particular, it is an aim of an aspect of the invention to take into account the dynamics of the engine used, in particular the acyclism of the engine.

In this regard, a subject of the invention, according to a first aspect, is a method for detecting the physical stoppage of an internal combustion engine comprising:
- a crankshaft that rotationally drives a toothed wheel having a plurality of teeth, each tooth corresponding to different angular positions of the crankshaft,
- a sensor positioned next to the toothed wheel and able to generate a signal characteristic of the passage of a tooth, the method comprising the following steps of:
- detecting a tooth from the signal generated by the sensor,
- identifying the tooth detected,
- triggering a timeout, and
- detecting a physical stoppage of the engine if the passage of a tooth adjacent to the tooth detected has not been detected before the end of the timeout.

The method according to an aspect of the invention is characterized in that the value of the timeout is dependent on the tooth identified, and in that it comprises the following steps:
- a step of determining the angular position of the crankshaft depending on the tooth identified, the value of the timeout being dependent on the angular position of the crankshaft,
- a preliminary step of determining the preferential stopping positions of the crankshaft and assigning a first timeout value for the preferential stopping positions and a step of assigning at least a second value for the other positions of the crankshaft,
- the first timeout value being less than the second timeout value.

Advantageously, but optionally, the method according to an aspect of the invention may also comprise at least one of the following features of the dependent claims:
- the crankshaft has a signature zone without teeth and the value of the timeout corresponding to the signature zone is greater than the value of the timeout corresponding to the other angular positions of the crankshaft,
- the method comprises a preliminary learning step in which a corresponding timeout value is assigned to at least one tooth,
- the step of learning the timeout value of a tooth comprises:
  - detecting a tooth from the signal generated by the sensor,
  - implementing a test step comprising:
    - triggering a timeout on the basis of the detection of said tooth, the timeout having a current timeout value,
    - determining the passage of a tooth adjacent to the tooth detected,
    - comparing the current timeout value with the timeout value of the tooth,
  - the timeout value of the tooth being modified such that:
    - if an adjacent tooth is detected, during the test step and when the current timeout value is greater than the timeout value of the tooth in question, the timeout value of the tooth is increased,
    - if no adjacent tooth is detected during the repeated implementation of the test step for a given number of times, the timeout value of the tooth is reduced, and
    - when the timeout value of the tooth has been reduced and the minimum has been reached, the timeout value of the tooth can be reduced no further during subsequent implementations of the test step,
- the timeout values are dependent on the tooth identified and on the temperature of the engine.

According to a second aspect, a subject of the invention is a computer program, for example a non-transitory computer program containing coded instructions for implementing the above-described method, when it is implemented by a computer, and a computer configured to implement the above-described method.

According to a third aspect, a subject of the invention is an internal combustion engine comprising:
- a crankshaft that rotationally drives a toothed wheel having a plurality of teeth, each tooth corresponding to different angular positions of the crankshaft,
- a sensor positioned next to the toothed wheel and able to generate a signal characteristic of the passage of a tooth,
- a processing unit comprising a computer and a communications interface for communicating with the sensor, the computer being configured to implement the above-described method.

The proposed method for detecting a physical stoppage of the engine relies on the application of a timeout, the value of which is dependent on the position of the crankshaft or on the number of the tooth of the toothed wheel rotationally driven by said crankshaft. It is therefore possible to apply a timeout adapted to the engine in question by taking into account the preferential positions of engine stoppage and/or the acyclism of the engine.

The rapidity of detecting an engine stoppage can also be improved by adapting the value of the timeout applied for the signature zone. The value of the timeout can at least be proportional to the number of absent teeth in this zone.

The timeout values used can be common to all the engines of a single type or be determined specifically for the engine in question. The timeout values are thus determined by learning with the aid of the signal generated by the sensor next to the toothed wheel. In this way, the timeout values can be optimized to be as low as possible while ensuring the robustness of detection. In addition, these values can be measured at different times in the life of the vehicle in order to correspond best to the actual operational state of the engine.

BRIEF DESCRIPTION OF THE DRAWINGS

Other features, aims and advantages of aspects of the invention will become apparent from the following description, which is purely illustrative and nonlimiting, and which should be read with reference to the appended drawings, in which.

DETAILED DESCRIPTION OF THE PREFERRED EMBODIMENTS

Figure 1:
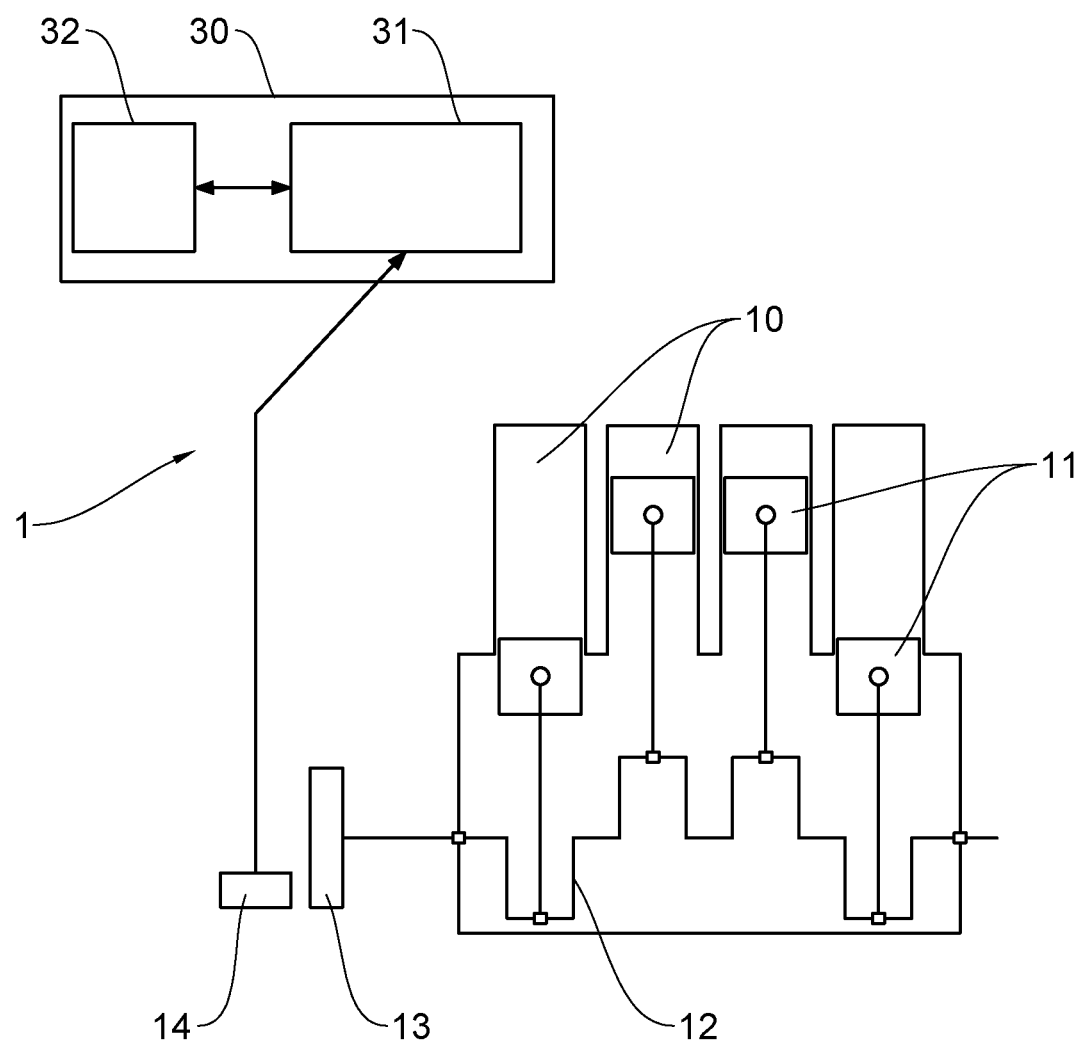
FIG. 1 schematically shows the system employed for detecting the engine stoppage according to an aspect of the invention.

Reference is made to FIG. 1, which schematically shows an internal combustion engine 1 comprising four cylinders 10, each cylinder containing a piston 11 that is able to move in translation in the cylinder, each piston 11 being driven by a crankshaft 12. The crankshaft 12 drives a toothed wheel 13 secured to the crankshaft 12. A sensor 14 is positioned next to the toothed wheel 13. The sensor 14 is able to generate a signal characteristic of the passage of a tooth of the toothed wheel 13 in front of it.

The internal combustion engine 1 also comprises a processing unit 30 comprising a computer 31, this computer being for example a processor, a microprocessor, or a microcontroller, connected to the sensor 14, and a memory 32. Code instructions are recorded in the memory 32 and executed by the computer 31 in order to implement the method described below for processing the data generated by the sensor 14.

Figure 2:
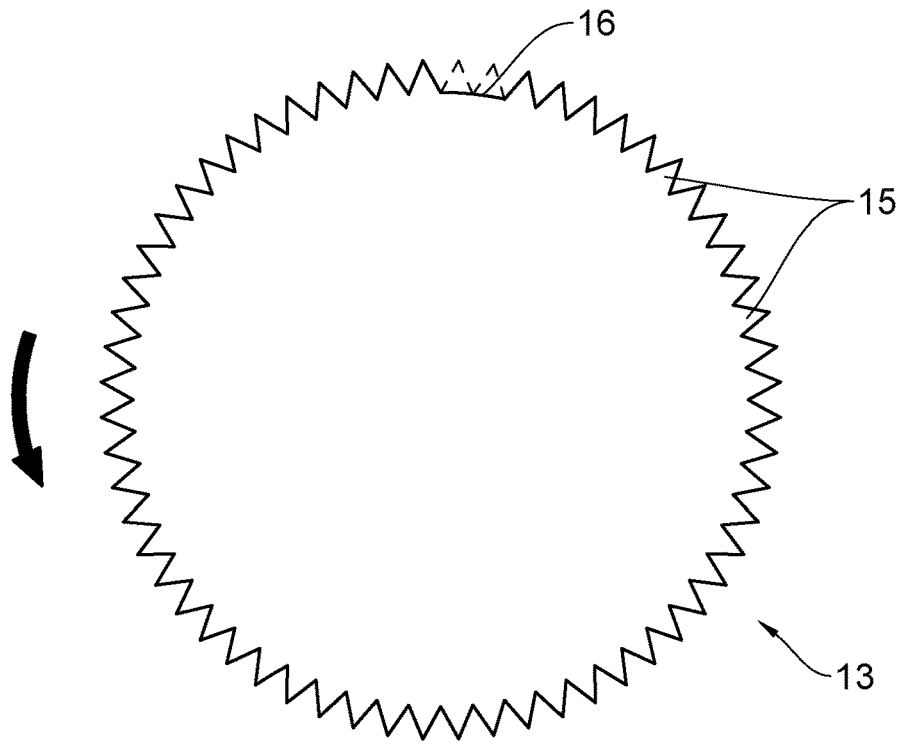
FIG. 2 shows a schematic face-on view of an example of the toothed wheel of the crankshaft.

FIG. 2 shows a known example of the toothed wheel 13 in more detail in a face-on view. The toothed wheel 13 has around its perimeter a plurality of teeth 15 that are angularly equidistant, and a signature zone 16. The signature zone 16 does not have teeth 15 and serves as the start of the angular marker for determining the angular position of the crankshaft. In the toothed wheel 13 described here, the teeth 15 are spaced apart by 6 degrees and the signature zone 16 has a width of 18 degrees (absence of two teeth). The sensor 14 next to the toothed wheel makes it possible to generate a signal representative of the passage of a tooth having, for each tooth detected, a rising front and a falling front. The sensor 14 likewise generates a signature signal corresponding to the passage of the signature zone 16 in front of the sensor. The sensor 14 is for example a bidirectional sensor of the CPDD type ("Crankshaft Position and Direction Determination") capable of generating signals with different widths depending on the direction of rotation of the crankshaft. With the sensor in question here, the rising front and the falling front are spaced apart by a duration of 45 μs when the toothed wheel moves in one direction of rotation and by a duration of 90 μs when the toothed wheel moves in the other direction of rotation, for example.

Figure 3:
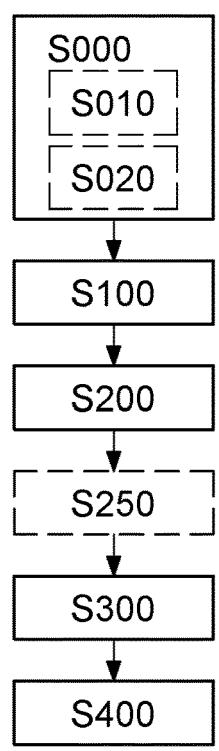
FIG. 3 schematically shows the main steps in a method for detecting an engine stoppage according to one embodiment of the invention.

With reference to FIG. 3, a description will now be given of the main steps of the method for detecting the physical stoppage of the engine described above according to one embodiment.

The method for detecting the engine stoppage comprises an initializing step S000, a step S100 of detecting a tooth from a signal generated by the sensor, a step S200 of identifying the tooth detected, a step S300 of triggering a timeout, and a step S400 of detecting a physical stoppage of the engine. It will be noted that the values of the timeouts are stored in the memory 32 during the initializing step S000. The values of the timeouts that are stored are dependent on the tooth numbers or on the angular positions of the teeth in question. The values of the timeouts can also be dependent on the temperature of the engine. Specifically, it is possible to increase the values of the timeouts when the temperature is higher, friction being less important at high temperature.

The step S100 of detecting a tooth comprises the detection, on the signal generated by the sensor, of a, rising or falling, front. The type of front detected remains constant while the method is being executed.

The step S200 of identifying the tooth detected comprises the determining of the number of the last tooth detected depending on the number of, rising or falling, fronts detected since the generation of the signature signal.

Moreover, the method may optionally comprise a step S250 of determining the angular position of the crankshaft corresponding to the tooth detected taking into account in particular the number of the tooth detected, the angular width of the signature zone and the angular distance between each tooth.

Next, during the step S300, a timeout is triggered, the timeout value of which is determined depending on the number of the tooth detected. This value is contained in the memory 32. When the method also comprises a step S250 of determining the angular position of the crankshaft depending on the tooth identified, the value of the timeout is determined depending on the angular position of the crankshaft.

During the step S400 of detecting a physical stoppage of the engine, it is determined whether another tooth has been detected before the end of the timeout. If the passage of another tooth, or adjacent tooth, is not detected before the end of the timeout, an engine stoppage is detected.

Optionally, the initializing step S000 comprises a preliminary step S010 of determining the preferential stopping positions of the crankshaft and assigning a timeout value for the preferential stopping positions of the crankshaft.

Figure 4:
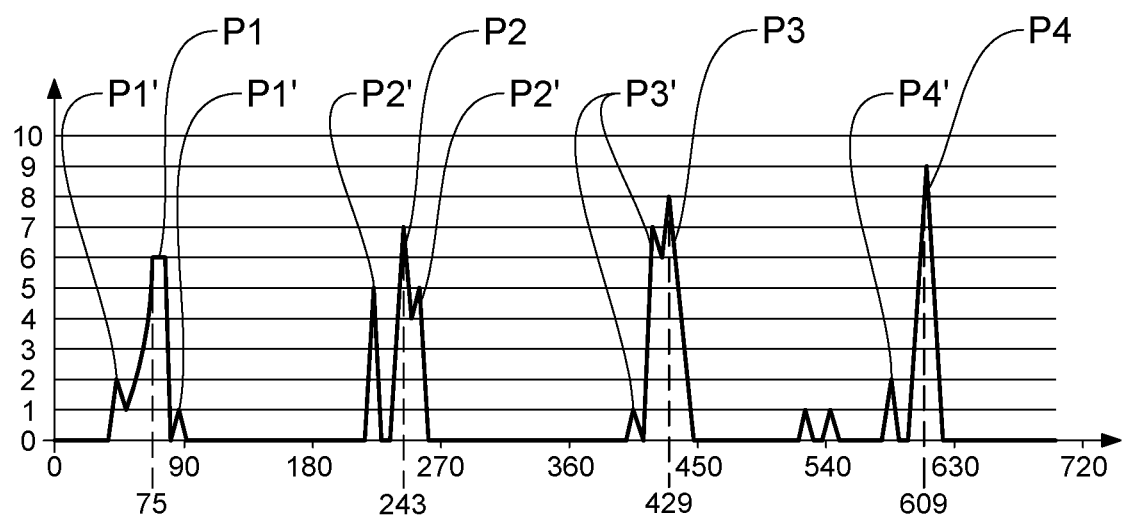
FIG. 4 illustrates the determination of the preferential stopping positions.

The preferential stopping positions can be determined in a similar way to the description given above by reproducing steps S100 to S400, the value of the timeout being constant and around or greater than 300 ms for example. By incrementing a counter each time an engine stoppage is detected for a tooth number or a given angular position of the crankshaft, a histogram such as the one shown with reference to FIG. 4 is obtained, the x-axis of which represents the angular position of the tooth detected and the y-axis of which represents the number of times that a physical stoppage of the engine has been detected. It will be noted that the angular position is between 0 and 720 degrees and corresponds to two crankshaft rotations or an engine cycle according to a representation known to a person skilled in the art for a four-stroke engine. It will also be noted that the peaks P1, P2, P3 P4 in particular correspond to preferential stopping positions and that it is possible to assign to these preferential stopping positions a common timeout value for example as described with reference to FIG. 5.

Figure 5:
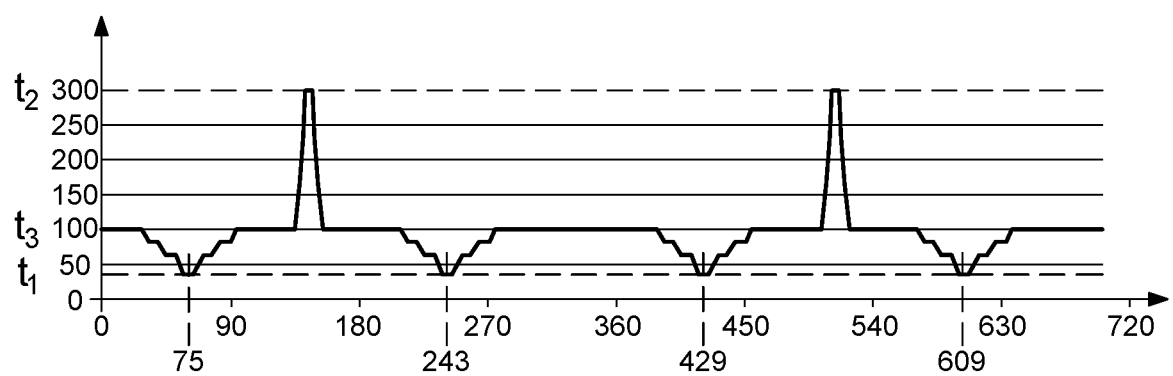
FIG. 5 shows the timeout values chosen in one embodiment of the invention.

FIG. 5 shows the values of timeouts depending on the angular positions of the crankshaft for an exemplary embodiment in which preferential stopping positions have been determined during the preliminary step S010. It will be noted that the angular positions of 75, 243, 429 and 609 degrees correspond to the preferential stopping positions P1, P2, P3, P4, respectively, illustrated with reference to FIG. 4. In one exemplary embodiment, a timeout value of t1=40 ms is assigned for the preferential stopping positions P1, P2, P3, P4.

For the angular positions corresponding to the signature zone S1, S2, it is possible to assign a timeout value of t2=300 ms for example.

And finally, for angular positions different than the signature zone and the preferential stopping peaks, it is possible to assign a timeout value of t3=100 ms for example.

Thus, by assigning different timeout values according to the angular position or the tooth identified, it is possible to reduce and optimize the detection time of an engine stoppage, taking the acyclism of the engine into account. In particular, when at least some of these timeout values are less than 300 ms, the detection time of an engine stoppage is reduced on average compared with the prior art device.

Advantageously, the timeout value of the preferential stopping zones t1 is less than the other timeout values t2 and t3, respectively.

The inventors have noted that these preferential stopping positions corresponded to an engine stoppage approximately half way between the top dead center and the bottom dead center of a piston in a compression phase, the top dead centers and bottom dead centers corresponding to the angular positions of 0 degrees, 180 degrees, 360 degrees, and 540 degrees. The preferential stopping positions reflect the acyclism of the engine. This is because the engine will tend to stop suddenly and more easily when the teeth in question are at a low speed. It is thus possible to apply, for these preferential stopping positions, a timeout value less than those considered for the other stopping positions of the crankshaft.

It will also be noted that the timeout value t2 in the signature zone is greater than the timeout value t3 referred to as the average. This is because, on account of the lack of teeth in the signature zone, the timeout value t2 is greater than the average value t3 in order to take into account the lack of teeth in the signature zone. Furthermore, the timeout value t2 is advantageously increased by a factor dependent on the number of teeth that are absent in the signature zone in order to obtain at least equivalent effectiveness of detection of an engine stoppage. For example, the timeout value t2 in the signature zone may correspond to the average timeout value t3 multiplied by Na+1, Na being the number of teeth that are absent in the signature zone. In the present case, two teeth (indicated by dashed lines in FIG. 2) are missing in the signature zone. Since either the rising fronts or the falling fronts of the signal generated by the sensor are detected, the timeout value t3 is advantageously multiplied by three for the teeth adjacent to the signature zone.

In the exemplary embodiment as described above, three different timeout values are used for three sets of different angular positions. It is also possible to vary the timeout value around the described preferential stopping positions P1, P2, P3, P4 between the timeout value t1 and the timeout value in order to take into account the presence of other, less frequent preferential stopping positions P1', P2', P3', P4' close to the main peaks P1, P2, P3, P4 for example as shown in FIG. 4.

It is possible for example to assign to the secondary peaks a timeout value proportional to the ratio between the main peaks P1, P2, P3, P4 and the secondary peaks P1', P2', P3', P4' in question or to take into account the position of the secondary peaks P1', P2', P3', P4' in order to determine the width of the variation in the timeout value around the main peaks as shown in FIG. 5 for example.

Of course, other variants are possible in which the preferential stopping positions are not taken into account. In this case, it is possible to distribute the timeout values between a value t2 and a value t3, the value t3 being assigned to the signature zone and the value t2 being assigned to the other angular positions.

In the exemplary embodiments described with reference to FIGS. 4 and 5, the timeout values are dependent on the angular positions. It goes without saying that the timeout values could have been assigned depending on the number of the tooth identified.

Likewise optionally, the initializing step S000 may comprise a learning step S020. During the learning step S020, a respective timeout is assigned to each tooth in question. The learning step S020 is described with reference to FIGS. 6A and 6B.

Figure 6A:
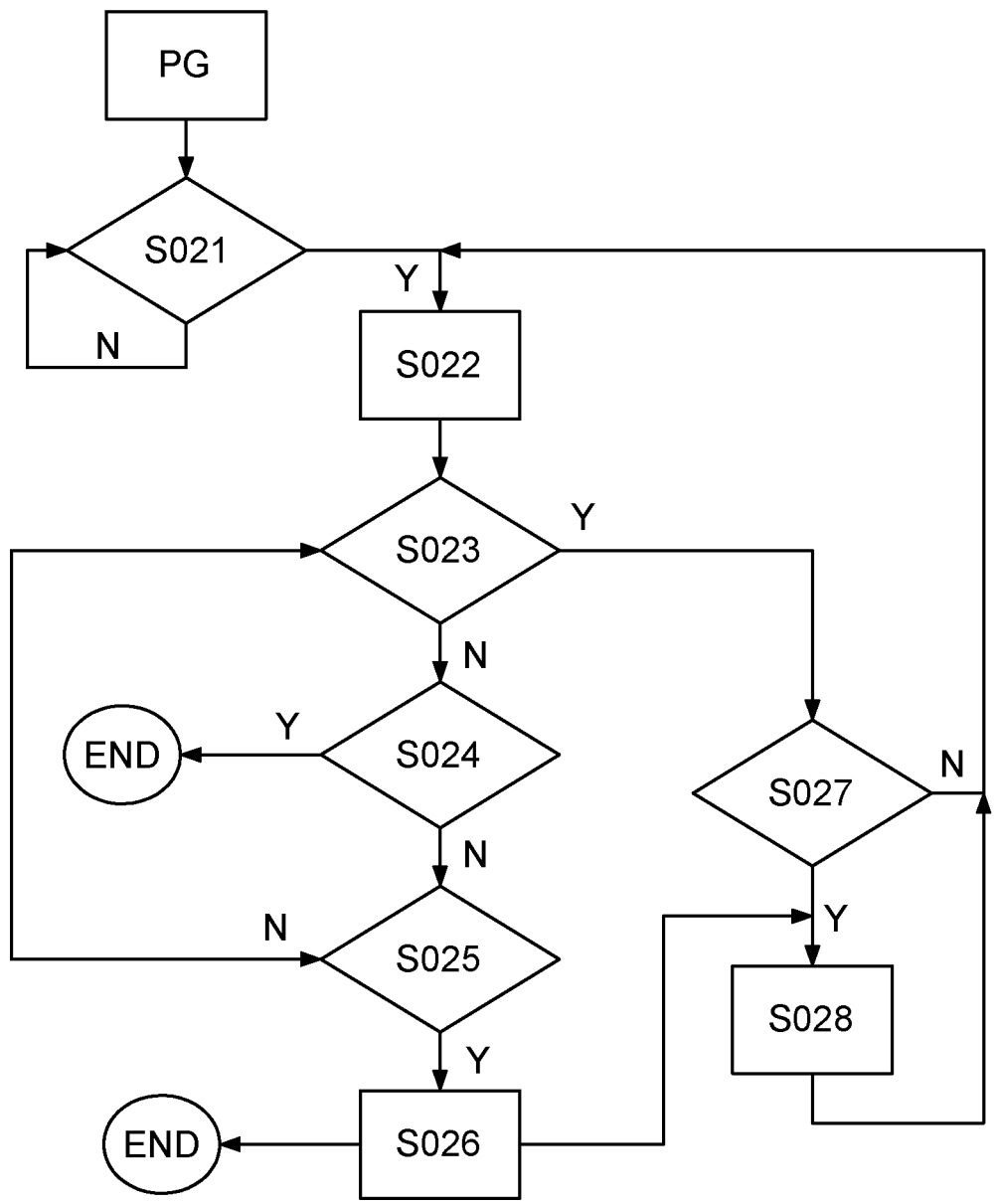
FIG. 6a shows an exemplary implementation of the learning step according to one embodiment of the invention.

FIG. 6A shows an exemplary implementation of the learning step S020 according to one embodiment of the invention. It is for example a program PG present in the memory 32 and implemented by the computer 31.

The method comprises a first step S021 during which it is determined whether a tooth has been detected in a similar manner to step S100. It is detected for example whether a, rising or falling, front has been detected in the last 10 milliseconds on the signal generated by the sensor. If no tooth has been detected, step S021 is repeated. If a tooth is detected, step S022 is carried out.

During step S022, the tooth detected is identified by its number N, the timeout value in the memory corresponding to the tooth detected TiCrkdetStop(N) is read and a timeout is triggered. The tooth detected is identified as described above in step S200.

Next, in a step S023, it is determined whether an adjacent tooth has been detected for example in the last 10 milliseconds.

If an adjacent tooth has been detected during step S023, step S027 is carried out. It will be noted that when an adjacent tooth has been detected during step S023, the value of the current timeout t corresponds to the period of time between the tooth detected during step S021 and the adjacent tooth detected during step S023.

During step S027, the value of the current timeout t is compared with the timeout value of the tooth TiCrkdetStop(N) and a threshold value for ensuring that the engine has not restarted automatically. The value of this threshold is calculated by adding the automatic restarting time of the engine, typically 70 ms, to the timeout value of the tooth in question TiCrkdetStop(N).

If the value of the current timeout t is between the timeout value of the tooth in question TiCrkdetStop(N) and the threshold value for ensuring that the engine has not restarted automatically, an adjacent tooth has been detected in the absence of engine restarting after the time corresponding to the timeout value of the tooth in question TiCrkdetStop(N). An engine stoppage has thus not occurred. The timeout value of the tooth in question TiCrkdetStop(N) is thus too small. The timeout value of the tooth in question TiCrkdetStop(N) is thus increased by a predetermined value, for example by adding a constant value to the timeout value of the tooth in question. An indicator Min signifying that the minimum for the timeout value of the tooth in question has been reached is also defined and a counter Ctr(N) of a number of iterations is reset to zero. Next, as described above, step S022 is returned to, in which in particular the new tooth detected is identified and a test phase is restarted.

If the current timeout value t is lower than the value of the timeout of the tooth TiCrkdetStop(N), a tooth has been detected before the time corresponding to the timeout value of the tooth. An engine stoppage has thus not occurred. Step S022 is then returned to, in which in particular the new tooth detected is identified and the test phase is restarted, in which it is determined whether an adjacent tooth has been detected and in which the value of the current timeout t is compared with the timeout value of the tooth in question TiCrkdetStop(N).

If the value of the current timeout t is greater than the threshold value for ensuring that the engine has not restarted automatically, the timeout values do not need to be modified, since this new tooth detected is caused by the activation of the starter, that is to say the restarting of the engine. Step S022 is then returned to, during which the number of the last tooth detected is determined, the corresponding timeout value in the memory is read and a new timeout is triggered.

By contrast, if no tooth adjacent to the tooth in question N has been detected during step S023, step S024 is carried out.

During step S024, it is determined whether a restart of the engine has taken place by activation of the starter. If a signal indicating that an engine restart has taken place is detected, the current timeout value is saved in the memory 32 and the program is interrupted. If an engine restart has not taken place, step S025 is carried out.

During step S025, it is determined whether the value of the current timeout t is greater than the timeout value of the tooth in question TiCrkdetStop(N).

If the value of the current timeout t is less than the timeout value of the tooth in question TiCrkdetStop(N), step S023 of detecting an adjacent tooth in the absence of a restart of the engine is repeated.

If the value of the current timeout t is greater than the timeout value of the tooth in question TiCrkdetStop(N), step S026 is carried out.

Figure 6B:
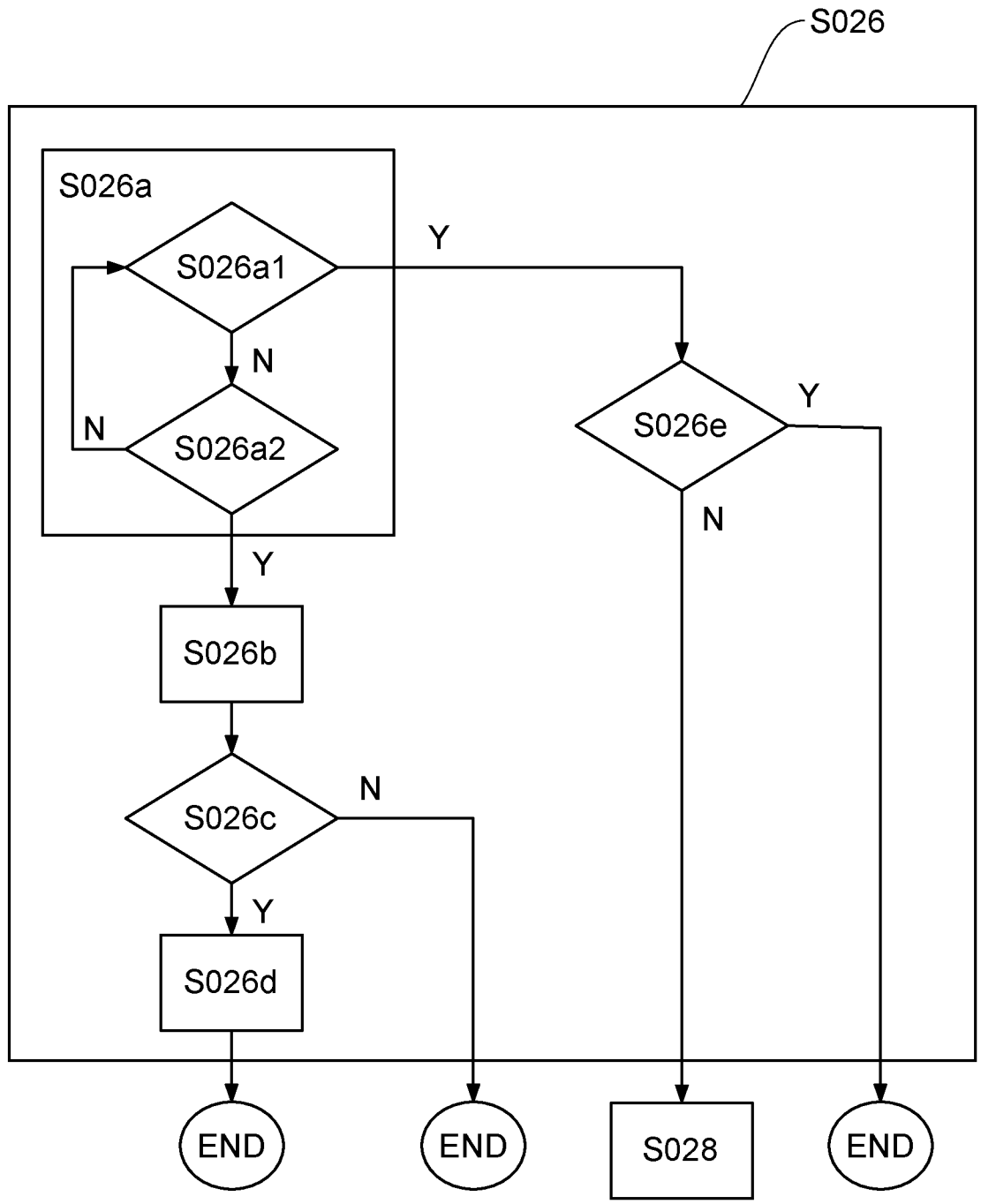
FIG. 6B shows the detail of one of the steps described with reference to FIG. 6A.

Step S026 is shown in more detail with reference to FIG. 6B. Step S026 makes it possible to determine whether a new tooth has been detected in a time period greater than the current timeout value t and to modify the value of the timeout of the tooth in question TiCrkdetStop(N) depending thereon.

During step S026a, it is determined whether a new tooth has been detected in a time period between the timeout value of the tooth in question TiCrkdetStop(N) and a threshold for ensuring that the engine has not restarted automatically, corresponding to activation of the starter, corresponding currently to a time of 70 ms after the timeout value TiCrkdetStop(N).

Step S026a comprises a substep S026a1 and a substep S026a2. During step S026a1, it is determined whether an adjacent tooth is detected in a predetermined time period, during the last 10 milliseconds for example.

If a new tooth has been detected during substep S026a1, step S026e is carried out.

If a new tooth has not been detected during substep S026a1, substep S026a2 is carried out.

During step S026a2, the value of the current timeout t is compared with a threshold for ensuring that the engine has not restarted automatically. The value of this threshold is calculated by adding a time of around 70 milliseconds for example to the timeout value of the tooth in question TiCrkdetStop(N).

If the value of the current timeout t is less than the threshold, the step S026a1 of detecting a new tooth is repeated.

If the value of the current timeout t is greater than this threshold, step S026b is carried out.

During step S026b, the counter Ctr(N) is incremented. The counter Ctr(N) makes it possible count the number of iterations of the test phase during which a new tooth has not been detected after the timeout value of the tooth in question TiCrkdetStop(N). After the counter has been incremented, step S026c is carried out.

During step S026c, it is determined whether the number of iterations permitted has been reached and whether the indicator Min indicates that the minimum for the timeout value of the tooth in question TiCrkdetStop(N) has been reached. If the number of iterations permitted has been reached and the indicator Min indicates that the minimum for the timeout value of the tooth in question TiCrkdetStop(N) has been reached, step S026d is carried out.

During step S026d, the timeout value of the tooth in question TiCrkdetStop(N) is modified by reducing its value by a predetermined value, for example 10 milliseconds.

By contrast, if a new tooth has been detected during substep S026a1, step S026e is carried out.

During step S026e, it is determined whether the engine has been restarted voluntarily by the driver by verifying whether the starter has been activated.

If the engine has been restarted voluntarily by the driver, the detection of an engine stoppage is not confirmed and the program is ended until a new tooth is detected during step S021.

If the engine has not been restarted voluntarily by the driver, an adjacent tooth has been detected after the timeout value of the tooth in question TiCrkdetStop(N). The above-described step S028 is thus carried out, in which the timeout value of the tooth in question TiCrkdetStop(N) is modified by increasing it by a predetermined value. The iteration counter Ctr(N) is set to zero and the indicator Min signifying that the minimum for the timeout value of the tooth in question TiCrkdetStop(N) has been reached is also defined.

The program PG described here therefore makes it possible, for each detected tooth in question, to modify, by learning, the timeout value to be applied during the method for detecting an engine stoppage described with reference to FIG. 3.

In one embodiment, the program PG is executed for each of the teeth of the crankshaft. The initializing step S000 described with reference to FIG. 3 then only comprises the step S020 of learning the timeout values. The initial values of the timeout values are stored in the memory 32 then modified by the implementation of the learning step S020.

In an embodiment variant, the program PG is executed for a predetermined set of teeth, corresponding for example to the preferential stopping positions. The initializing step S000 described with reference to FIG. 3 can then comprise, in addition to the step S020 of learning the timeout values, a step S010 of determining the preferential stopping positions described above with reference to FIG. 3.

The following table shows the values obtained for the different parameters implemented during the learning step in one exemplary embodiment.

TABLE 1 values obtained during the implementation of the step of learning the timeout values.

| Ti (ms) | TiCrkdetStop(N) (ms) | Ctr(N) | Min(N) |
|---|---|---|---|
| Ti>> TiCrkdetStop | 100 | 1 | 0 |
| Ti>> TiCrkdetStop | 100 | 2 | 0 |
| Ti>> TiCrkdetStop | 100 | 3 | 0 |
| Ti>> TiCrkdetStop | 100 | 4 | 0 |
| Ti>> TiCrkdetStop | 100 | 5 | 0 |
| Ti>> TiCrkdetStop | 90 | 1 | 0 |
| Ti>> TiCrkdetStop | 90 | 2 | 0 |
| Ti>> TiCrkdetStop | 90 | 3 | 0 |
| Ti>> TiCrkdetStop | 90 | 4 | 0 |
| Ti>> TiCrkdetStop | 90 | 5 | 0 |
| Ti>> TiCrkdetStop | 80 | 1 | 0 |
| 85 | 80 | — | 1 |
| Ti>> TiCrkdetStop | 90 | — | 1 |
| Ti>> TiCrkdetStop | 90 | — | 1 |
| 92 | 90 | — | 1 |
| Ti>> TiCrkdetStop | 100 | — | 1 |
| 105 | 100 | — | 1 |
| Ti>> TiCrkdetStop | 110 | — | 1 |
| Ti>> TiCrkdetStop | 110 | — | 1 |
| Ti>> TiCrkdetStop | 110 | — | 1 |

The parameter Ti corresponds to the time measured between the adjacent tooth and the tooth in question. The time measured between the tooth in question, in this case the tooth number 36, and the adjacent tooth, number 35 or 37 depending on the direction of rotation of the crankshaft, is determined by virtue of the timeout triggered following the detection of the tooth in question. It is the measured current timeout value t.

The parameter TiCrkdetStop(N) corresponds to the timeout value for the tooth in question, in this case the tooth number 36, i.e. N=36.

The value of this parameter is modified by the learning step S020 described with reference to FIGS. 6A and 6B.

The counter Ctr(N) is an iteration counter as described above.

The variable Min(N) is an indicator which, when it has a value of 1, signifies that the minimum timeout value TiCrkdetStop(N) has been reached.

In the example described here, the initial value of TiCrkdetStop(N) is 100 ms. The value of TiCrkdetStop(N) decreases after five iterations by increments of 10 ms until it reaches the value of 80 ms when no tooth has been detected after a predetermined acquisition time after TiCrkdetStop(N), i.e. Ti>>TiCrkdetStop(N) by convention. Next, after a first iteration during which no adjacent tooth has been detected, an adjacent tooth is detected at 85 ms, i.e. after the current value of 80 ms for TiCrkdetStop(N). The value of TiCrkdetStop(N) is thus increased by 10 ms and the indicator Min(N) is set to one to signify that the minimum has been reached. Next, the value of TiCrkdetStop(N) can only increase. The counter Ctr(N) is no longer taken into account and the value of TiCrkdetStop(N) is increased as soon as a tooth is detected in the period of time after TiCrkdetStop(N), in particular when an adjacent tooth is detected at 92 ms, while the value of TiCrkdetStop(N) is equal to 90 ms, and when an adjacent tooth is detected at 105 ms, while the value of TiCrkdetStop(N) is equal to 100 ms.

The timeout value used by the method for detecting an engine stoppage corresponds to the final value of TiCrkdetStop(N) when the implementation of the learning step is stopped.

In order for the values obtained to be reliable, the implementation of the learning step can be stopped after a given number of kilometers traveled, of the order of several thousand kilometers.

Furthermore, in order to take into account the actual operation of the engine, the learning step can be implemented periodically, after a certain number of kilometers have been traveled.

The invention claimed is:

1. A method for detecting the physical stoppage of an internal combustion engine comprising:
a crankshaft that rotationally drives a toothed wheel having a plurality of teeth, each tooth corresponding to different angular positions of the crankshaft,
a sensor positioned next to the toothed wheel and able to generate a signal characteristic of the passage of a tooth,
the method comprising:
detecting a tooth from the signal generated by the sensor, identifying the tooth detected,
triggering a timeout, and
detecting a physical stoppage of the engine if the passage of a tooth adjacent to the tooth detected has not been detected before the end of the timeout,
wherein the value of the timeout is dependent on the tooth identified, and the method further comprises:
a step of determining the angular position of the crankshaft depending on the tooth identified, the value of the timeout being dependent on the angular position of the crankshaft,
a preliminary step of determining the preferential stopping positions of the crankshaft and assigning a first timeout value for the preferential stopping positions and a step of assigning at least a second value for the other positions of the crankshaft, the first timeout value being less than the second timeout value.

2. The detection method as claimed in claim 1, wherein the timeout values are dependent on the tooth identified and on the temperature of the engine.

3. A non-transitory computer program containing code instructions for implementing the method as claimed in claim 1, when it is implemented by a computer.

4. A computer configured to implement the method as claimed in claim 1.

5. An internal combustion engine comprising:
- a crankshaft that rotationally drives a toothed wheel having a plurality of teeth, each tooth corresponding to different angular positions of the crankshaft,
- a sensor positioned next to the toothed wheel and able to generate a signal characteristic of the passage of a tooth,
- a processing unit comprising a computer and a communications interface for communicating with the sensor, wherein the computer is configured to implement the method as claimed in claim 1.

6. The detection method as claimed in claim 1, wherein the crankshaft has a signature zone without teeth and wherein the value of the timeout corresponding to the signature zone is greater than the value of the timeout corresponding to the other angular positions of the crankshaft.

7. The detection method as claimed in claim 6, wherein the method comprises a preliminary learning step in which a corresponding timeout value is assigned to at least one tooth.

8. The detection method as claimed in claim 1, wherein the method comprises a preliminary learning step in which a corresponding timeout value is assigned to at least one tooth.

9. The method as claimed in claim 8, wherein learning the timeout value of a tooth comprises:
- detecting a tooth from the signal generated by the sensor, implementing a test step comprising:
  - triggering a timeout on the basis of the detection of said tooth, the timeout having a current timeout value,
  - determining the passage of a tooth adjacent to the tooth detected,
  - comparing the current timeout value with the timeout value of the tooth,
- the timeout value of the tooth being modified such that:
  - if an adjacent tooth is detected, during the test step and when the current timeout value is greater than the timeout value of the tooth in question, the timeout value of the tooth is increased,
  - if no adjacent tooth is detected during the repeated implementation of the test step for a given number of times, the timeout value of the tooth is reduced, and
  - when the timeout value of the tooth has been reduced and the minimum has been reached, the timeout value of the tooth can be reduced no further during subsequent implementations of the test step.

* * * * *